United States Patent [19]

Evans et al.

[11] 3,888,819

[45] June 10, 1975

[54] COMPOSITIONS COMPRISING SULFAMIDE FOR INCREASING FLAME RESISTANCE OF POLYMERS

[75] Inventors: Francis E. Evans, Hamburg, N.Y.;
Kenneth B. Gilleo, St. Paul, Minn.

[73] Assignee: Allied Chemical Corporation, New York, N.Y.

[22] Filed: Apr. 29, 1974

[21] Appl. No.: 465,224

[52] U.S. Cl. ...... 260/45.8 N; 252/8.1; 260/45.85 B; 260/45.85 V; 260/45.85 H; 260/45.85 T; 260/45.85 S; 260/45.85 P; 260/45.9 R; 260/45.75 R; 260/45.75 K; 260/45.75 C; 260/45.75 W

[51] Int. Cl. ............................................. C08g 17/56

[58] Field of Search ............ 260/45.85, 25 AJ, 45.9, 260/45.8; 106/15; 117/136; 252/8.1

[56] References Cited
UNITED STATES PATENTS

| | | | |
|---|---|---|---|
| 2,142,116 | 1/1939 | Cupery | 117/138 |
| 2,381,487 | 8/1945 | Cook et al. | 106/15 |
| 2,912,394 | 11/1959 | Stilbert et al. | 117/138 |
| 3,409,463 | 11/1968 | Le Blanc et al. | 106/15 |
| 3,785,858 | 1/1974 | Chapin | 117/138 |

OTHER PUBLICATIONS

Chemistry and Uses of Fire Retardants – Lyons; 1970; pp. 413 and 414.

*Primary Examiner*—V. P. Hoke
*Attorney, Agent, or Firm*—Michael L. Dunn; Anthony J. Stewart

[57] ABSTRACT

A composition for increasing flame resistance of a step-reaction polymer comprising sulfamide and certain organic acids or their metal salts, a method of using the composition to treat the polymer and the resulting treated polymer.

10 Claims, No Drawings

COMPOSITIONS COMPRISING SULFAMIDE FOR INCREASING FLAME RESISTANCE OF POLYMERS

This invention relates to step-reaction polymers such as nylon which exhibit improved flame resistance. More specifically, the invention relates to nylon, polyester and polyurethane polymers treated with compositions which impart improved flame resistance thereto and to the process of so treating the polymers.

In the prior art numerous compounds have been used as additives to step-reaction polymers to reduce flammability of the polymers. For example inorganic and organic tin, phosphorous and halogen containing compounds have been used to reduce flammability of nylon. These compounds have not, however, been entirely successful due to inefficiency or polymer degradation.

In addition to the tin, phosphorous and halogen containing compounds, certain compounds containing nitrogen and sulfur have been employed to improve flame resistance. While some of these nitrogen and sulfur containing compounds are an improvement over the other prior art compounds, they still do not create as much flame resistance as is desired or necessary.

BRIEF DESCRIPTION OF THE INVENTION

In accordance with this invention it has been discovered that nylon and other step-reaction polymers can be treated with certain synergistic additive compositions to impart a high degree of flame resistance to the polymer.

The additive composition, with which the step-reaction polymers are treated, comprises:
a. sulfamide; and
b. a compound selected from the group consisting polyhydroxy-polycarboxy acids and their metal and ammonium salts, mercapto polycarboxy acids and their metal and ammonium salts, polyhydroxy benzoic acids and their metal and ammonium salts, the lithium and sodium salts of monohydroxy polycarboxy acids, and the metal and ammonium salts of trithiocyanuric acid.

The novel step-reaction polymer having increased flame resistance is prepared by treating the polymer with from about 1 to about 15 weight percent of the above additive compositions.

DETAILED DESCRIPTION OF THE INVENTION

In accordance with this invention a step-reaction polymer, such as nylon, polyester or polyurethane is treated with at least 1 and preferably about 2 weight percent of a composition comprising sulfamide and a compound selected from the group consisting of polyhydroxy-polycarboxy acids and their metal and ammonium salts, mercapto polycarboxylic acids and their metal and ammonium salts, polyhydroxy benzoic acids and their metal and ammonium salts, the lithium and sodium salts of monohydroxy polycarboxy acids, and the metal and ammonium salts of trithiocyanuric acid. Generally less than about 15 weight percent and preferably less than about 8 weight percent of the composition is used since generally the greater percentages do not materially increase flame resistance and can sometimes cause undesirable effects such as crocking, i.e. flaking on the surface of the polymer. Percentages lower than 1 weight percent, while providing some increase in flame resistance, generally do not improve flame resistance to a desirable level. The step-reaction polymer is generally a polymer formed by the step-wise intermolecular condensation of reactive groups. These polymers have also been known as condensation polymers and include polyesters, polyanhydrides, polyacetals, polyamides and polyurethanes. For a discussion of step-reaction polymers, see *Text Book of Polymer Science* Second Edition, Fred W. Billmeyer Jr., John Wiley and Sons, Inc. 1971. The most preferred step-reaction polymers which are treated in accordance with this invention are nylon, polyurethane and polyesters.

The step-reaction polymer, e.g. nylon, may be treated by wetting the surface of the polymer with a solution or emulsion containing the above composition.

The preferred compounds for use in conjunction with the sulfamide preferably comprise from about 40 to about 85 weight percent of the compositions and generally contain fewer then 10 carbon atoms although compounds containing more than ten carbon atoms may be used provided that the ratio of hydroxy groups plus mercapto groups to the number of carbon atoms is at least 1 to 5 and the ratio of carboxy groups to the number of carbon atoms is at least 1 to 5.

The polyhydroxy-polycarboxy acids are organic acids having a plurality of hydroxyl and carboxyl groups. Examples of suitable polyhydroxy-polycarboxy acids are 2,5 dihydroxy p-benzene diacetic acid; dihydroxy maleic acid; dihydroxy malonic acid; dihydroxy tartaric acid; mucic acid; gibberellic acid; alginic acid and dihydroxy adipic acid.

The mercapto polycarboxylic acids are organic acids having a plurality of carboxyl groups and at least one mercapto (—SH) group. Examples of suitable mercapto polycarboxylic acids are thiomalic acid; 4-mercapto cyclohexane 1,2 dicarboxylic acid; mercapto adipic acid and mercapto phthalic acid.

The polydroxy benzoic acids are organic acids having a plurality of hydroxy groups and at least one carboxy group attached to a benzene ring. Examples of suitable polyhydroxy benzoic acids are gallic acid; 2,4,6 trihydroxy benzoic acid; trimethoxy benzoic acids; syringic acid; dihydroxy benzoic acids; hydroxy dimethoxy benzoic acids; hydroxy methoxy benzoic acids and dimethoxy benzoic acids.

The monohydroxypolycarboxy acids are organic acids containing one hydroxy group and a plurality of carboxyl groups. Examples of suitable monohydroxy polycarboxy acids are hydroxy malonic acid; citric acid; malic acid; hydroxy adipic acid; hydroxy phthalic acid and hydroxy cyclohexane 1,2 dicarboxylic acid.

The preferred metals used in forming metal salts of the polyhydroxy polycarboxy acids, polyhydroxy benzoic acids and trithiocyanuric acid are Group I, II, III, IV, V, VI, VII and VIII metals of the second, third, fourth and fifth periods of the Modern Periodic Table of Elements. The most preferred metals are Li, Na, K, Mg, Ca, Cu, Zn, Al and Sn. Of the most preferred metals, Li, Ca and Mg have been found to provide the best results although in certain cases alkali metals are generally more than satisfactory.

In treating the step-reaction polymer in accordance with the process of this invention, from about 1 to about 15 weight percent of the treating composition, as previously described, is applied to the step-reaction polymer. In practicing the invention, the composition is dissolved in solvent, usually water, to make a solution of about 0.5 to about 12 weight percent, more preferably from about 2 to about 8 weight percent and most preferably from about 4 to about 6 weight percent. The step-reaction polymer, usually in the form of fabric or carpet, is then soaked by the solution which may contain other additives commonly used in finishing baths to improve properties such as penetration or water repellency. The fabric or carpet is then squeezed with any suitable apparatus, such as pad rollers, to remove excess solution. The squeezing apparatus, such as the rollers, is adjusted to give from about 25 to about 300 weight percent, preferably from about 50 to about 200 weight percent and most preferably from about 75 to about 150 weight percent wet pick-up. The fabric or carpet material is then dried in air in a dryer or oven at temperatures up to about 150°C. but preferably less than about 125°C. The solution may be applied to the step-reaction polymer in numerous ways. For example, the step-reaction polymer may be immersed in the solution or the solution may be sprayed upon the step-reaction polymer or applied to the step-reaction polymer by means of pad rollers.

The following examples serve to illustrate the process and composition of the invention. In the following examples the composition is applied to the step-reaction polymer, in the form of a carpet, by dipping the carpet into a solution of the composition and squeezing the dipped carpet to remove excess solution. The carpet is then dried and weighed so that the percentage of composition added to the carpet can be calculated. The flame resistance of the carpet is then measured using a modified U.S. Department of Commerce test DOC FF 70 wherein a 250 watt heat lamp is positioned 5 inches from the carpet surface and is controlled by a Variac. The lamp is turned on for 5 minutes at a preset voltage on the Variac in order to provide a more vigorous test. The higher the voltage applied to the heat lamp the greater the heat applied to the carpet prior to burning the carpet. The temperature of the carpet is measured with a thermocouple. The carpet is then burned by placing a 150 milligram methenamine pill in the center of the carpet. The pill is then ignited. The higher the temperature which can be applied to the carpet before the carpet fails to extinguish within 90 seconds after the pill is finished burning, the better the flame resistant properties of the carpet.

EXAMPLES

The following Table I shows the highest temperature applied tp the carpet before the carpet fails to extinguish within 90 seconds after the pill is finished burning, the additive composition used, and the percentages of additive on the carpet. In each case in Table I it will be noted that when sulfamide is used in combination with a compound selected from the group consisting of polyhydroxy-polycarboxy acids and their metal and ammonium salts, mercapto polycarboxy acids and their metal and ammonium salts, polyhydroxy benzoic acids and their metal and ammonium salts, the lithium and sodium salts of monohydroxy polycarboxy acid and the metal and ammonium salts of trithiocyanuric acid, the temperature at which the carpet fails the test is at least as high as the temperature at which the carpet fails when sulfamide is used alone and is higher than when the above compound is used alone. These results indicate that the use of sulfamide in conjunction with the previously described compound gives a synergistic effect which enhances the flame resistance of the carpet.

TABLE I

| EXAMPLE | COMPOSITION | WEIGHT PERCENT APPLIED TO CARPET | HIGHEST TEMPERATURE °C |
|---|---|---|---|
| 1 | Sulfamide | 10 | 160 |
| 2 | 2,4-dihydroxy benzoic acid | 10.3 | 160 |
| 3 | 3 parts 2,4-dihydroxy benzoic acid; 1 part sulfamide | 11.9 | 185 |
| 4 | Sodium malate | 8.7 | 115 |
| 5 | 1 part sodium malate; 1 part sulfamide | 9.2 | 165 |
| 6 | Sodium citrate | 9.4 | 115 |
| 7 | 1 part sodium citrate; 1 part sulfamide | 9.7 | 165 |
| 8 | Thiomalic acid | 11.5 | 140 |
| 9 | 1 part thiomalic acid; 1 part sulfamide | 8.2 | 160 |
| 10 | Magnesium trithiocyanurate | 7.5 | 120 |
| 11 | 1 part magnesium trithiocyanurate; 1 part sulfamide | 7.2 | 160 |
| 12 | Lithium thiomalate | 11.0 | 120 |
| 13 | 1 part lithium thiomalate; 1 part sulfamide | 10.4 | 190 |
| 14 | Tartaric acid | 10.3 | 120 |
| 15 | 2 parts tartaric acid; 1 part sulfamide | 9.3 | 175 |

In all cases parts and percentages are by weight unless otherwise indicated.

What is claimed is:

1. A composition for increasing flame resistance of a step-reaction polymer selected from the group consisting of polyesters, polyanhydrides, polyacetals, polyamides and polyurethanes comprising:
   a. sulfamide; and
   b. from about 40 to about 85 weight percent of a compound selected from the group consisting polyhydroxy-polycarboxy acids and their metal and ammonium salts, mercapto polycarboxylic acids and their metal and ammonium salts, polyhydroxy benzoic acids and their metal and ammonium salts, the lithium and sodium salts of monohydroxy polycarboxy acids, and the metal and ammonium salts of trithiocyanuric acid.

2. The composition of claim 1 wherein the compound is a lithium salt.

3. The composition of claim 1 wherein the compound is an alkali metal salt of trithiocyanuric acid.

4. The composition of claim 1 wherein the compound is gallic acid.

5. A step-reaction polymer selected from the group consisting of polyesters, polyanhydrides, polyacetals, polyamides and polyurethanes containing from about 1 to about 15 weight percent of a composition comprising:
   a. sulfamide; and
   b. from about 40 to about 85 weight percent of a compound selected from the group consisting polyhydroxy-polycarboxy acids and their metal and ammonium salts, mercapto polycarboxylic acids and their metal and ammonium salts, polyhydroxy benzoic acids and their metal and ammonium salts, the lithium and sodium salts of monohydroxy polycarboxy acids, and the metal and ammonium salts of trithiocyanuric acid.

6. A polymer in accordance with claim 5 wherein the polymer is nylon.

7. A method for increasing the flame resistance of a step-reaction polymer selected from the group consisting of polyesters, polyanhydrides, polyacetals, polyamides and polyurethanes comprising applying to the polymer from about 1 to about 15 weight percent of a composition comprising:
   a. sulfamide; and
   b. from about 40 to about 85 weight percent of a compound selected from the group consisting polyhydroxy-polycarboxy acids and their metal and ammonium salts, mercapto polycarboxylic acids and their metal and ammonium salts, polyhydroxy benzoic acids and their metal and ammonium salts, the lithium and sodium salts of monohydroxy polycarboxy acids, and the metal and ammonium salts of trithiocyanuric acid.

8. The method of claim 7 wherein the polymer is nylon.

9. The polymer of claim 5 wherein the polymer is polyurethane.

10. The method of claim 7 wherein the polymer is polyurethane.

* * * * *